No. 652,189. Patented June 19, 1900.
A. S. LITTLEJOHN.
CURRYCOMB SUBSTITUTE AND MASSAGE BLOCK
(Application filed Sept. 13, 1899.)
(No Model.)

WITNESSES:
J. W. Wright
E. Alheim

INVENTOR
ANDREW S. LITTLEJOHN
BY
Howson and Howson
HIS ATTORNEYS.

UNITED STATES PATENT OFFICE.

ANDREW S. LITTLEJOHN, OF STAMFORD, CONNECTICUT, ASSIGNOR TO CHARLES W. BALDY, OF SAME PLACE.

CURRYCOMB SUBSTITUTE AND MASSAGE-BLOCK.

SPECIFICATION forming part of Letters Patent No. 652,189, dated June 19, 1900.

Application filed September 13, 1899. Serial No. 730,338. (No model.)

*To all whom it may concern:*

Be it known that I, ANDREW S. LITTLEJOHN, a resident of Stamford, county of Fairfield, State of Connecticut, have invented a Currycomb Substitute and Massage-Block, of which the following is a specification.

The main object of my invention is to provide a currycomb substitute which will not scratch or irritate the hide of the animal, but will efficiently remove dandruff and dirt and will, moreover, have a massaging and soothing effect.

It is a fact well known to those accustomed to the handling of horses and other animals that all currycombs, brushes, or cleaners of whatsoever material as used up to the present time are open to one or other of two objections—namely, they either scratch or irritate the hide of the horse or other animal and spoil its temper or else they are ineffective to remove the dirt, dandruff, &c. Many of the devices are open to both objections, being injurious to the hide, making sores, causing more or less irritation to the animals upon which these are used, and being of little or no benefit. To overcome these objections and produce an efficient cleaner and massage device, I make a block of suitable shape of porous earthen or mineral substance—such, for instance, as porous fire-clay, cement, or cinder.

Figure 1:
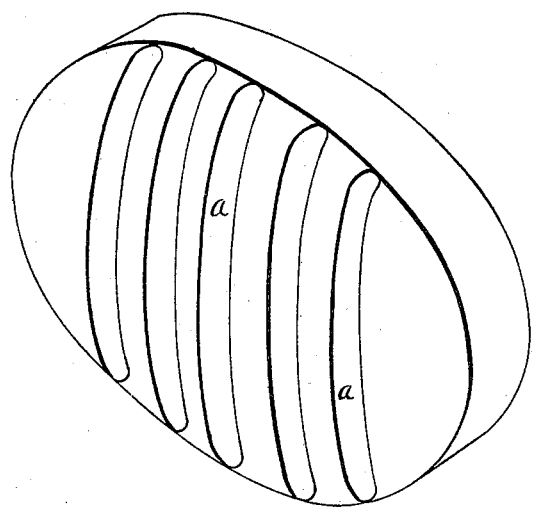
Figure 2:
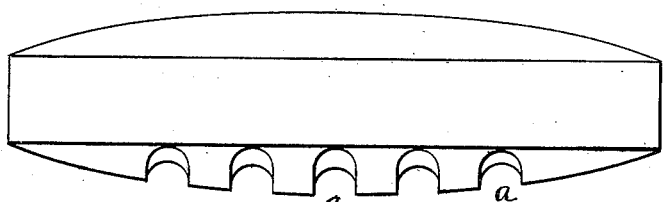
Figure 3:
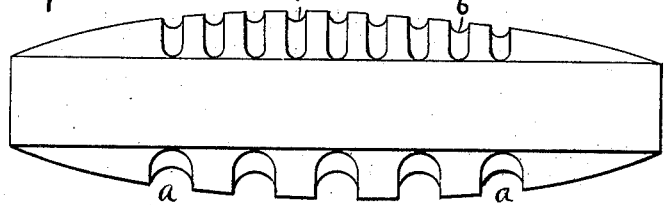

In the accompanying drawings, Figure 1 is a perspective view of the preferred form of my device. Fig. 2 is a side view of the same, and Fig. 3 is a side view of a modification.

I prefer to make the device in the form of an oval disk with the opposite faces more or less rounding or convex and of a size suitable to be held in one hand. One of the faces is divided by grooves into a series of ribs *a*, preferably running transversely of the block and preferably parallel to each other, as indicated in the drawings. The other face of the block may be plain, as shown in Fig. 2, or it may have a series of finer grooves *b*, as illustrated in the modification, Fig. 3. While the ribbed or grooved face may be termed the "working-face" of the block, any and all parts thereof may be used with good effect.

I have given the device thorough practical tests, and I find that it obviates entirely the objections above pointed out to the ordinary currycombs and other such devices heretofore used. It does not scratch the hide of the horse or other animal or make sores or cause any irritation. On the contrary, it has a soothing effect, and in point of fact its use gives an efficient massage, relieving muscular soreness and assisting the circulation. At the same time it cleans the hide very efficiently, removing dirt, dandruff, &c., and leaves the hide smooth, clean, and glossy. I attribute this efficient cleaning effect in a large part to the fact that the pores in the block as the same is drawn over the horse's hide act with something of a suction effect.

Another advantage of my currycomb substitute is that it can be very easily and thoroughly cleaned after it has been used on the horse or other animal by simply rinsing it in water, and it will dry out very quickly.

I claim as my invention—

1. A currycomb substitute consisting of a block of porous mineral with ribs on its working face.

2. A currycomb substitute consisting of a block of porous mineral with a rounding or convex working face and transverse ribs thereon.

3. A currycomb consisting of a block of porous mineral in the form of an oval disk with rounding or convex faces and transverse ribs on the working face.

In testimony whereof I have signed my name to this specification in the presence of two subscribing witnesses.

ANDREW S. LITTLEJOHN.

Witnesses:
L. S. BEGENT,
WM. F. WATERBURY.